(12) United States Patent
Dellis et al.

(10) Patent No.: US 11,119,038 B1
(45) Date of Patent: Sep. 14, 2021

(54) MILLIMETER WAVE MOLECULAR SENSOR

(71) Applicant: Texas Instruments Incorporated, Dallas, TX (US)

(72) Inventors: Argyrios Dellis, Allen, TX (US); Adam Joseph Fruehling, Garland, TX (US); Bichoy Bahr, Allen, TX (US); Juan Herbsommer, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 14 days.

(21) Appl. No.: 16/845,962

(22) Filed: Apr. 10, 2020

(51) Int. Cl.
*G01N 21/3581* (2014.01)
*G01J 3/447* (2006.01)
*G01J 3/42* (2006.01)
*G01J 3/10* (2006.01)

(52) U.S. Cl.
CPC ............ *G01N 21/3581* (2013.01); *G01J 3/10* (2013.01); *G01J 3/42* (2013.01); *G01J 3/447* (2013.01)

(58) Field of Classification Search
CPC .......... G01N 21/3581; G01J 3/42; G01J 3/10; G01J 3/447
See application file for complete search history.

(56) References Cited

U.S. PATENT DOCUMENTS

2019/0346814 A1* 11/2019 Fruehling ................ G01S 7/35

OTHER PUBLICATIONS

Rothbart et al. "Analysis of Human Breath by Millimeter-Wave/ Terahertz Spectroscopy," Sensors 2019, vol. 19, p. 2719 (Year: 2019).*

* cited by examiner

*Primary Examiner* — David P Porta
*Assistant Examiner* — Meenakshi S Sahu
(74) *Attorney, Agent, or Firm* — John R. Pessetto; Charles A. Brill; Frank D. Cimino (57) ABSTRACT

A millimeter wave molecular sensor system is provided. The system includes a physics cell configured to contain a sample, a directional coupler configured to receive input millimeter waves, partition the input millimeter waves into a pump signal and a probe signal for transfer to the physics cell, a receiver configured to receive millimeter waves exiting the physics cell, a Faraday rotator coupled between a pump transmitter and the physics cell, and a coupling iris coupled between the Faraday rotator and the physics cell, configured to pass millimeter waves having a first polarization into the physics cell. The Faraday rotator includes a Faraday material, and an electronic device configured to apply a magnetic field to the Faraday material parallel to a propagation direction of the millimeter waves such that when the electronic device is activated, the Faraday material rotates a polarization of the millimeter waves passing through the Faraday rotator.

20 Claims, 6 Drawing Sheets

MILLIMETER WAVE MOLECULAR SENSOR

TECHNICAL BACKGROUND

Millimeter wave (mmW) spectroscopy is commonly used for the detection and identification of various compounds in a wide variety of applications. Typical mmW spectroscopes are large, expensive machines, sensitive to noise and background fluctuations. Many applications require fast and precise measurements. Also, since the machines are expensive, time spent using the spectroscope is at a premium, and any wasted time is costly.

OVERVIEW

In an implementation, a millimeter wave molecular sensor system is provided. The millimeter wave molecular sensor system includes a physics cell configured to contain a sample, and a directional coupler configured to receive input millimeter waves, partition the input millimeter waves into a pump signal and a probe signal, each signal comprising a portion of power of the input millimeter waves.

The millimeter wave molecular sensor system also includes a pump transmitter coupled with the directional coupler configured to transfer the pump signal to the physics cell, a probe transmitter coupled with the directional coupler configured to transfer the probe signal to the physics cell, and a receiver coupled with the physics cell configured to receive millimeter waves exiting the physics cell after passing through the sample.

The millimeter wave molecular sensor system further includes a Faraday rotator coupled between the pump transmitter and the physics cell configured to pass millimeter waves from the pump transmitter to the physics cell, and a coupling iris coupled between the Faraday rotator and the physics cell, configured to pass millimeter waves having a first polarization into the physics cell.

The Faraday rotator includes a Faraday material, and an electronic device configured to apply a magnetic field to the Faraday material parallel to a propagation direction of the millimeter waves passing through the Faraday material such that when the electronic device is activated, the Faraday material rotates a polarization of the millimeter waves passing through the Faraday rotator.

In another implementation, a method for operating a millimeter wave molecular sensor system is provided. The method includes the following steps: a. receiving an input millimeter wave having a first polarization swept over a range of frequencies, and b. partitioning the input millimeter wave into a pump signal and a probe signal, each signal comprising a portion of power of the input millimeter wave.

The method also includes the following steps: c. transferring the probe signal into a physics cell through a probe transmitter, and d. transferring the pump signal having the first polarization through a pump transmitter, and through a Faraday rotator, the Faraday rotator configured to transform the pump signal having the first polarization into a pump signal having a second polarization when activated.

The method further includes the following step: e. transferring an output of the Faraday rotator through a coupling iris to the physics cell. The coupling iris is configured to pass pump signals having the first polarization and to block pump signals having the second polarization.

The method also includes the following steps: f. receiving millimeter waves exiting the physics cell at a receiver configured to receive millimeter waves exiting the physics cell after passing through the sample, and g. transferring an output of the receiver to an electronic recording device, configured to receive and record millimeter wave amplitude data from the receiver as the pump signal and probe signal sweep through the range of frequencies.

The method further includes the following steps: h. generating first millimeter wave amplitude data by performing steps a-g while the Faraday rotator is inactive, and i. generating second millimeter wave amplitude data by performing steps a-g while the Faraday rotator is active.

BRIEF DESCRIPTION OF THE DRAWINGS

While several implementations are described in connection with these drawings, the disclosure is not limited to the implementations disclosed herein. On the contrary, the intent is to cover all alternatives, modifications, and equivalents.

DETAILED DESCRIPTION

Figure 1:
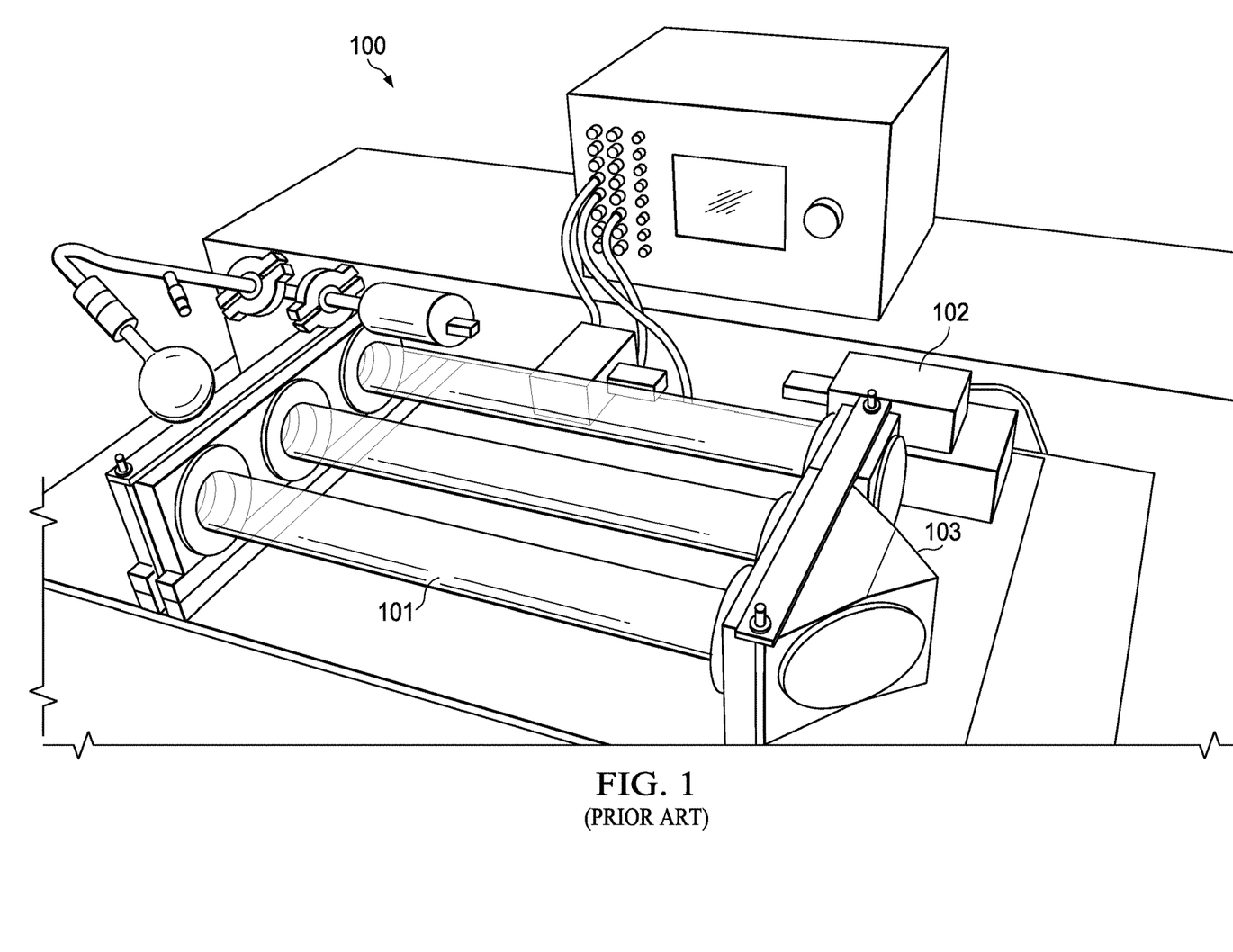
FIG. 1 illustrates a conventional system for a millimeter wave gas sensor.

FIG. 1 illustrates a conventional system 100 for a millimeter wave (mmW) gas sensor that includes a series of three one-meter-long tubes 101 with a set of reflectors 103 pumped with a large physical vacuum and supporting electronics 102. The volume of the system may be on the order of 0.5-2 cubic meters. Most current mmW spectroscopy systems rely on the utilization of external pumps, valves, and large vacuum sealed chambers.

Some mmW spectroscopy systems are compact, such as the compact millimeter wave system described in U.S. Patent Application Publication Number 2019/0346814 A1, titled "COMPACT MILLIMETER WAVE SYSTEM", filed on Apr. 30, 2019, which is hereby incorporated by reference in its entirety. In various embodiments, the present invention is capable of application in both standard and compact spectroscopy systems.

Figure 2:
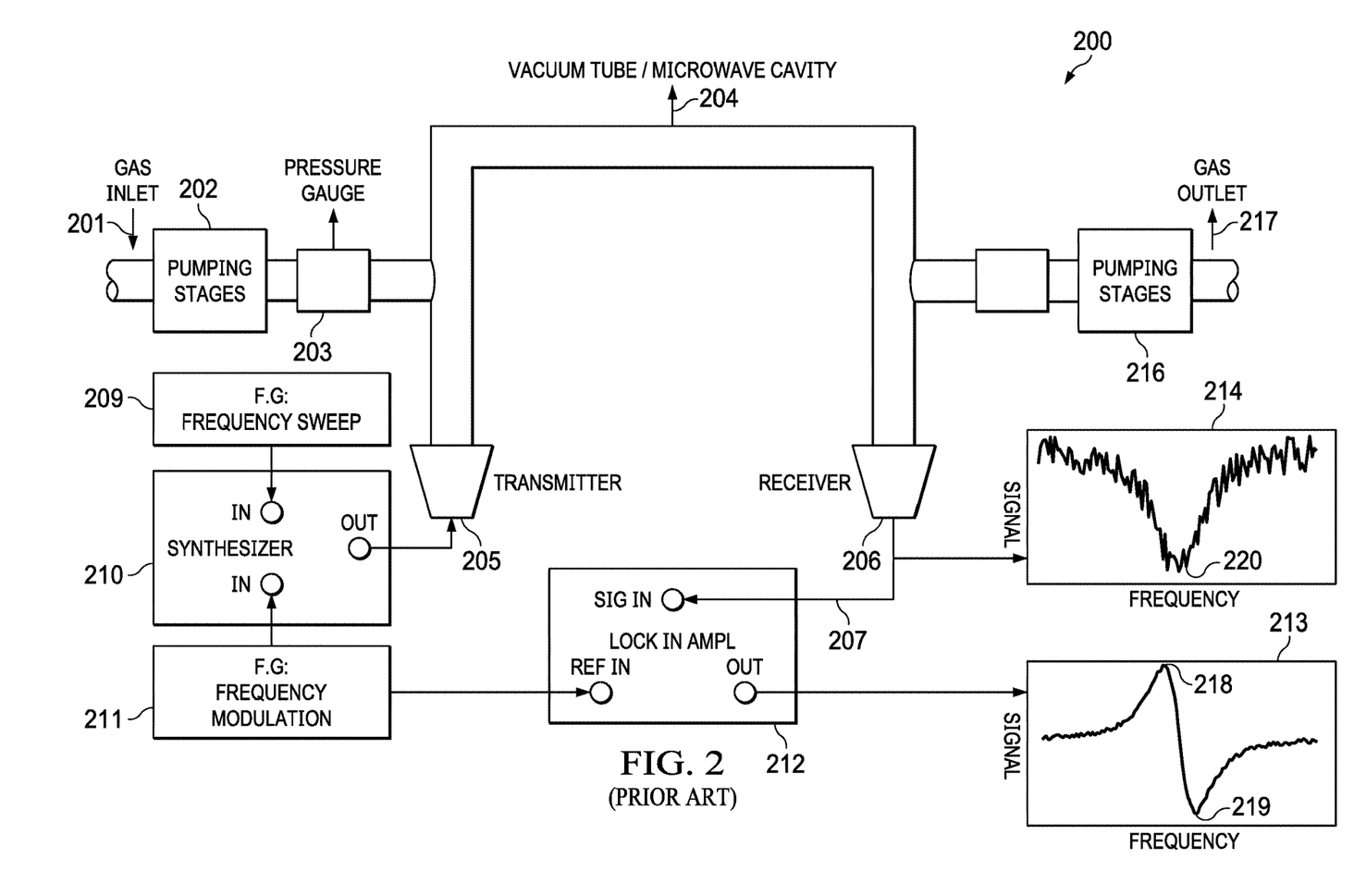
FIG. 2 illustrates an example system of a conventional millimeter wave spectroscopy system including external electronic devices.

FIG. 2 illustrates an example system 200 of a conventional millimeter wave spectroscopy system including external electronic devices. The system includes gas inlet 201 connected to mass flow controller 202 that is monitored with pressure gauges 203. The gas is pumped into physics cell 204, and pumped out with a second pumping device 216 and gas outlet 217. A millimeter wave electromagnetic signal is transmitted into physics cell 204.

According to an example embodiment, a frequency of the electromagnetic signal ranges from 60 GHz to 300 GHz. The electromagnetic signal is received by receiver 206 and synced into input 207 of lock in amplifier 212 to frequency source 211 and absorption across the frequency range is generated. The output signal of the receiver is monitored with a chart 214 or other electronic data recording device. In some example embodiments, this will tend to just be a diode detector configured to convert the output signal to a low frequency readout for comparison to the input. In example configurations, it is not plotted for monitoring, but rather tracked by the feedback and control loop (lock in amplifier). The output signal of the lock in amplifier is monitored with another chart 213 or other electronic recording device.

Lock In detection is a way to increase the signal to noise ratio (SNR). Essentially the lock in amplifier is a very good bandpass filter that detects signals only around certain frequency. In this example system the signal coming out of the synthesizer is frequency modulated (FM). This signal interacts with the molecules and then received on the receiver. The lock in amplifier detects only signals at the modulation frequency, and thus, the SNR is increased compared to the signal in chart 214.

This example device includes a transceiver electrically coupled to the first 205 and second 206 antennas and configured to inject a transmit signal into physics cell 204 through the first antenna, the signal interrogates the molecules in the cavity generating absorption dips at the quantum transition frequencies of the gases in the cavity, the signal is detected in the second antenna. By scanning a frequency band of interest, it is possible to detect the presence of different gases in the cavity by identifying the quantum absorption frequencies.

Synthesizer 210 receives input from frequency generator 209 and frequency modulator 211 and outputs a signal to the physics cell. In one example embodiment, signal generator 209 initially sweeps the transmission output frequency through a band known to include the quantum transitions of the gases in physics cell 204 (e.g., transitioning upward from an initial frequency below the suspected quantum transition frequency, or initially transitioning downward from an initial frequency above the suspected quantum transition frequency, or other suitable sweeping technique or approach).

The transceiver monitors the received energy via an input coupled with (e.g. electrically connected to) a second conductive coupling structure in order to identify the transmission frequency associated with peak absorption by the gas in the physics cell 204 (e.g., minimal reception at the receiver). Once the quantum absorption frequency is identified, a loop filter moves the source signal generator transmission frequency close to that absorption frequency (e.g., 183.31 GHz), and modulates the signal at a very low frequency to regulate operation around the null or minima in the transmission efficiency representing the ratio of the received energy to the transmitted energy.

The loop filter provides negative feedback in a closed loop operation to maintain the signal generator operating at a transmit (TX) frequency corresponding to the quantum frequency of the cavity dipolar molecule gas and dynamically adjusts a frequency of the transmit signal based on the error signal. The transceiver circuit in certain implementations is implemented on or in an integrated circuit (not shown), to which the physics cell 204 is electrically coupled for transmission of the TX signal via output 205 and for receipt of the RX signal via input 206.

The transceiver is operable when powered for providing an alternating electrical output signal TX to the first conductive coupling structure for coupling an electromagnetic field to the interior of physics cell 204, as well as for receiving the alternating electrical input signal RX from a second conductive coupling structure representing the electromagnetic field received from physics cell 204. The transceiver circuit is operable for selectively adjusting the frequency of the electrical output signal TX in order to reduce the electrical input signal receive (RX) by interrogation to operate clock generator 209 at a frequency which substantially maximizes the molecular absorption through rotational state transitions, and for providing a reference clock signal REF_CLK at the frequency of the TX output signal.

Figure 3:
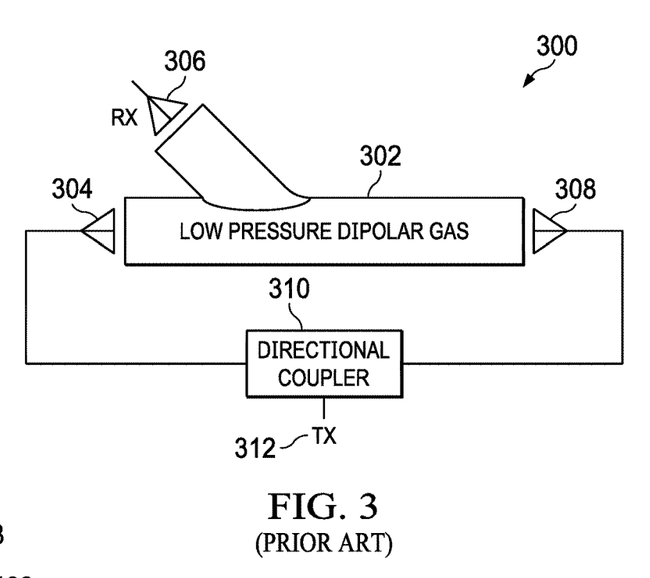
FIG. 3 illustrates an example system of a conventional pump/probe millimeter wave spectroscopy cell.

FIG. 3 illustrates an example system 300 of a conventional pump/probe millimeter wave spectroscopy cell 302. In this example embodiment physics cell 302 contains a low-pressure dipolar gas, pump transmitter 304 and probe transmitter 308 are configured to transfer millimeter waves to physics cell 302, and receiver 306 is configured to receive millimeter waves exiting physics cell 302 after passing through the sample.

Directional coupler 310 is configured for use as a power splitter. Directional coupler 310 receives power as input millimeter waves through the input TX 312, and directs most of the power to pump transmitter 304 while the remainder goes to probe transmitter 308. This ratio may be set based upon an input (not shown) to directional coupler 310.

Since millimeter wave sensor system 300 is measuring very small changes in millimeter waves during operation, it is very sensitive to noise and any fluctuations in the background. Thus, during conventional operation, millimeter wave sensor system 300 is operated once with an empty physics cell 302, and then with a physics cell 302 containing the sample under investigation. The outputs of these two operations are then subtracted to obtain the desired spectroscopic data. Other systems utilize two physics cells 302, one empty, and one containing the sample under investigation, allowing them to perform the two measurements quickly without having to evacuate and fill a single physics cell 302.

Figure 4:
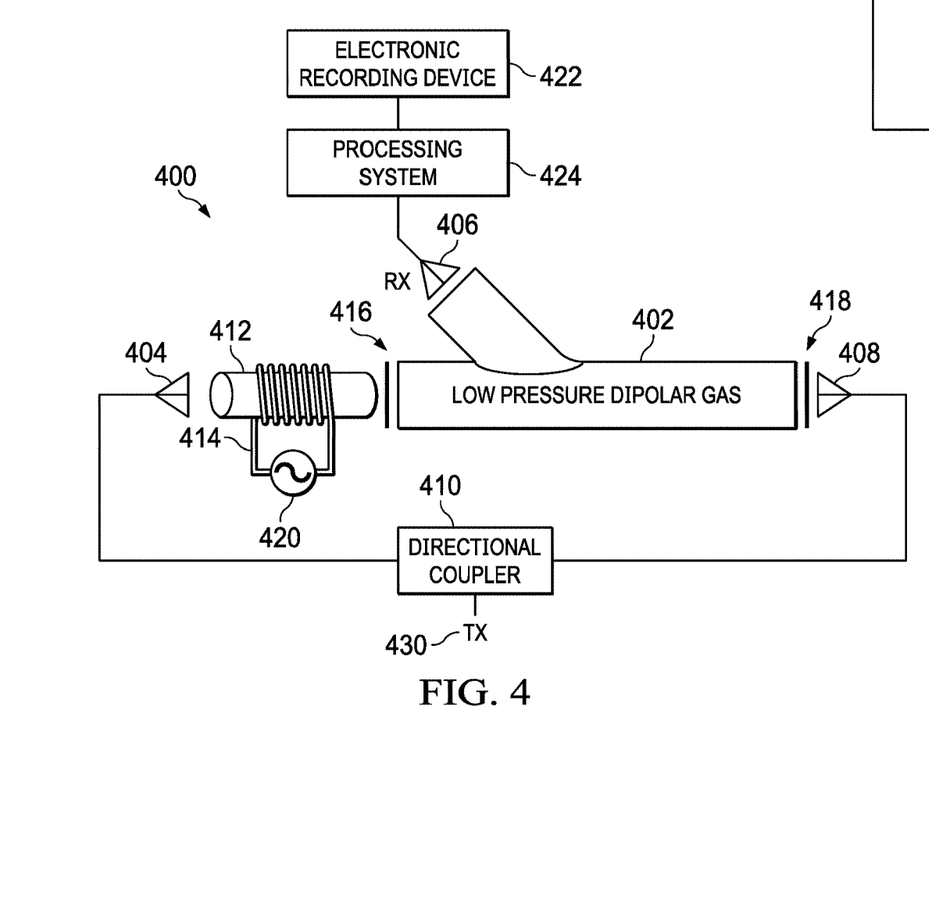
FIG. 4 illustrates an example implementation of a millimeter wave molecular sensor system.

FIG. 4 illustrates an example implementation of a millimeter wave molecular sensor system 400. In this example embodiment physics cell 402 contains a low-pressure dipolar gas. Directional coupler 410 is configured for use as a power splitter. Directional coupler 410 receives power through the input TX 430 in the form of input millimeter waves swept over a range of frequencies, and directs most of the power to pump transmitter 404 as a pump signal, while the remainder goes to probe transmitter 408 as a probe signal. This power ratio may be set based upon an input (not shown) to directional coupler 410.

Pump transmitter 404 is configured to transfer the pump signal having a first polarization swept over a range of frequencies to physics cell 402 through a Faraday rotator and coupling iris 416, and probe transmitter 408 is configured to transfer the probe signal to physics cell 402. These millimeter waves (photons) are detected (received) by receiver 406. The detected signal from receiver 406 is recorded 422 and processed 424. Probe transmitter 408 is coupled with physics cell 402 through coupling link 418.

Outputs from receiver 406 are transferred to electronic recording device 422, which is configured to receive and record millimeter wave amplitude data from receiver 406 as the millimeter waves sweep through the range of frequencies. Processing system 424 receives the recorded millimeter wave amplitude data from electronic recording device 422 and processes the millimeter wave amplitude data to produce molecular spectroscopy data, identify molecules within the sample, and to provide a user with the identity of the molecules within the sample.

In this example embodiment, a Faraday rotator and coupling iris 416 have been placed between pump transmitter 404 and physics cell 402. The Faraday rotator comprises Faraday material 412, and an electronic device 414 configured to apply a magnetic field to Faraday material 412. In this example embodiment, electronic device 414 is a coil substantially surrounding Faraday material 412, and is configured to apply a magnetic field to Faraday material in a vector parallel to a propagation direction of the millimeter waves passing through the Faraday material 412 when activated.

Figure 5:
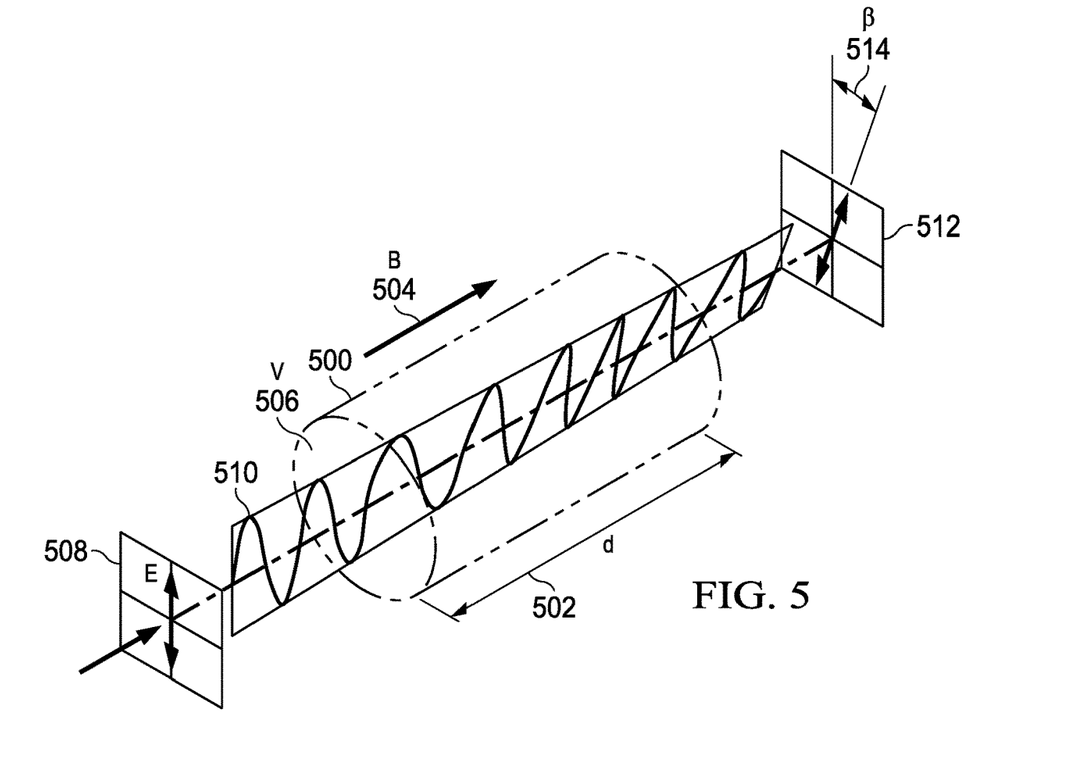
FIG. 5 illustrates an example implementation of a Faraday rotator, as illustrated in FIG. 4.

When coil 414 is activated, the Faraday material 412 rotates a polarization of the millimeter waves passing through the Faraday rotator 412 from pump transmitter 404 to physics cell 402. Dimensions of Faraday material 412 are selected to provide a desired rotation of the millimeter waves. In an example implementation Faraday material 412 is designed to rotate the millimeter waves transferred by pump transmitter 404 by at least five degrees when coil 414 is activated. Operation of the Faraday rotator is illustrated in FIG. 5 and described in detail below.

In some example embodiments of the present invention, the Faraday rotator itself is a separate physics cell, and the Faraday material is a gas at low pressure. In various embodiments, the gas is a paramagnetic gas such as NO, $O_2$, $ClO_2$, or a diamagnetic gas such as $NH_3$. In other example embodiments a single gas is trapped in both the Faraday rotator and the physics cell.

Figure 6:
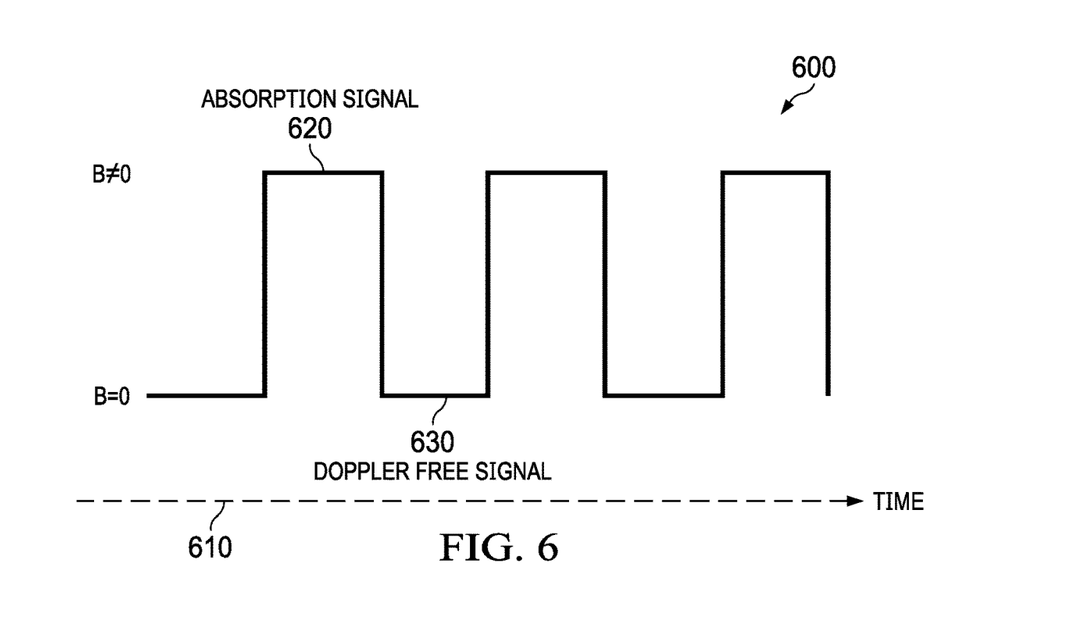
FIG. 6 illustrates an example operation of a signal generator for use in activating/inactivating a Faraday rotator, as illustrated in FIG. 4.

Coil 414 is controlled by signal generator 420. In an example embodiment, signal generator 420 applies a square wave to coil 414, activating and inactivating coil 414 in a series of cycles. This operation is illustrated in FIG. 6 and described below.

Coupling iris 416 is located between the Faraday rotator and physics cell 402, and is configured to only pass millimeter waves having a defined polarization into physics cell 402. (Basically, coupling iris 416 is a polarizing filter.) In various embodiments, coupling iris exhibits varying degrees of variation in the polarization of the millimeter waves that it allows to pass. For example, a high-quality coupling iris may allow only millimeter waves within less than one degree of the desired polarization to pass, while a low-quality coupling iris may allow for wider variation of the millimeter waves.

In operation, when coil 414 is inactive, millimeter waves from pump 404 having a first polarization pass through Faraday material 412 without any change in polarization. In configurations where coupling iris 416 is oriented to allow millimeter waves having the first polarization to pass through to physics cell 401, when coil 414 is inactive, the millimeter waves having the first polarization pass from pump transmitter 404 into physics cell 402. When coil 414 is active, Faraday material 412 rotates the millimeter waves having a first polarization from pump transmitter 404 into millimeter waves having a second polarization different from the first polarization. In some example embodiments, the second polarization is different from the first polarization by at least five degrees.

In the example implementation described above, Faraday material 412 is designed to rotate the millimeter waves transferred from pump transmitter 404 by at least five degrees when coil 414 is activated, and coupling iris 416 blocks the millimeter waves having the second polarization from entering physics cell 402. Simply, Faraday rotator and coupling iris are configured to act as a switch to either block or allow millimeter waves from pump transmitter 404 to enter physics cell 402.

Other example embodiments may be configured such that coupling iris 416 transmits the millimeter waves when the Faraday rotator is activated, and blocks the millimeter waves when the Faraday rotator is inactive, all within the scope of the present invention.

Figure 7A:
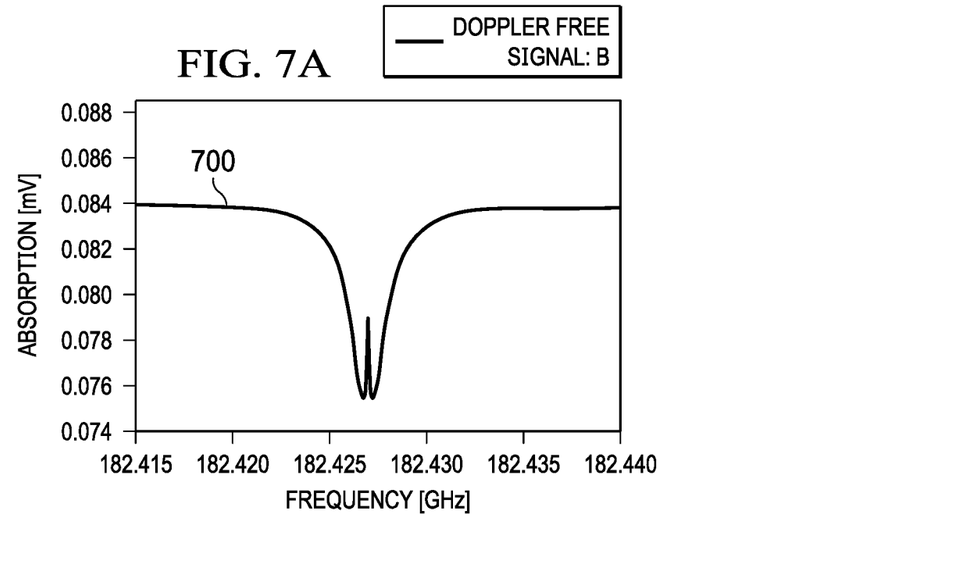
FIG. 7A illustrates an example output of an example implementation of a millimeter wave molecular sensor system when the Faraday rotator is active.
Figure 7B:
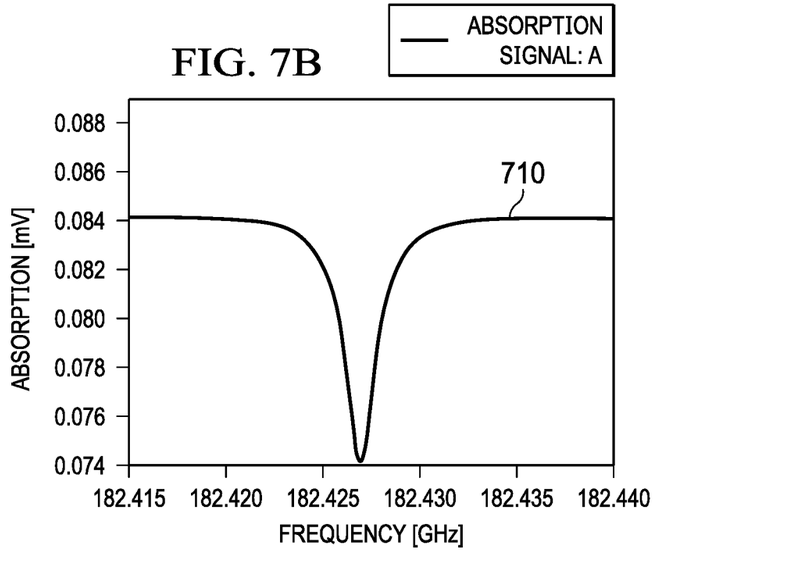
FIG. 7B illustrates an example output of an example implementation of a millimeter wave molecular sensor system when the Faraday rotator is inactive.

This configuration allows millimeter wave molecular sensor system 400 to quickly make two separate measurements using a single physics cell 402. One measurement is made with coil 414 inactive and coupling iris 416 allowing the millimeter waves from pump transmitter 404 to pass into physics cell 402, and a second measurement is made with coil 414 active and coupling iris 416 blocking the millimeter waves from pump transmitter 404. The first measurement provides a doppler free signal as illustrated in FIG. 7A, and the second measurement provides an absorption signal as illustrated in FIG. 7B.

In an example implementation, in operation, electronic recording device 422 records first millimeter wave amplitude data from receiver 406 as the millimeter waves sweep through the range of frequencies while coil 414 is inactive, and records second millimeter wave amplitude data from receiver 406 as the millimeter waves sweep through the range of frequencies while coil 414 is active. Processing system 424 produces molecular spectroscopy data by subtracting the second millimeter wave amplitude data from the first millimeter wave amplitude data.

In another example implementation, signal generator 420 applies a repeating electronic signal to coil 414 such that coil 414 alternates between being activated and inactivated on a repeating cycle. The millimeter waves sweep through the range of frequencies each time coil 414 is activated and inactivated, and processing system 424 produces molecular spectroscopy data during each cycle.

Processing system 424 averages the molecular spectroscopy data produced during a plurality of cycles to reduce noise in the final data and to provide final spectroscopy data for identification of molecules within the sample in physics cell 402. In some example implementations, processing system 424 identifies the molecules within the sample in physics cell 402, and provides a user with their identities.

FIG. 5 illustrates an example implementation of a Faraday rotator, as illustrated in FIG. 4. In this example, Faraday material 500 is defined by its Verdet constant 506 and length 502 of the path linearly polarized light 510 travels through the material. The plane 508 of linearly polarized light is rotated when a magnetic field 504 is applied in parallel to the propagation direction of the light. The angle of rotation 514 is calculated by:

$$\beta = VBd$$

where β is the angle of rotation in radians, B is the magnetic flux density in the direction of propagation in teslas, and d is the length of the path in meters where the light and magnetic field interact. V is the Verdet constant for the Faraday material 500. It is an empirical proportionality constant (in units of radians per tesla per meter) and varies with wavelength and temperature. It has been tabulated for a variety of materials. Note that due to relative path length and reasonably achievable field strength, it is difficult to rotate the millimeter waves by 90 degrees.

When a magnetic field having a flux density of B is applied to Faraday material 500 having a thickness of d and a Verdet constant of V, the linearly polarized light 510 is rotated by an angle of rotation β as shown on plane 512. By selecting a Faraday material 500 with a particular Verdet constant, a desired thickness 502 of the material 500 may be calculated from the above equation.

FIG. 6 illustrates an example operation of a signal generator 420, as illustrated in FIG. 4. In this example implementation, signal generator 420 is configured to apply a square wave to coil 414 activating and inactivating the Faraday rotator and acting as a switch between pump transmitter 404 and physics cell 402. Proceeding along the time axis 610, when the output of signal generator 420 is high B≠0 and coil 414 is activated, millimeter waves from pump transmitter 404 are prevented from reaching physics cell 402. The resulting signal received by receiver 406 is called the absorption signal 620.

When the output of signal generator 420 is low B=0 and coil 414 is inactive, millimeter waves from pump transmitter 404 are allowed to reach physics cell 402. The resulting signal received by receiver 406 is called the doppler free signal 630.

FIG. 7A illustrates an example output of an example implementation of a millimeter wave molecular sensor system when the Faraday rotator is inactive. This example illustrates an example output from receiver 406 when the output of signal generator 420 is low, coil 414 is inactive, and pump transmitter 404 is transmitting millimeter waves through physics cell 402. The resulting signal is called the doppler free signal 700.

FIG. 7B illustrates an example output of an example implementation of a millimeter wave molecular sensor system when the Faraday rotator is active. This example illustrates an example output from receiver 406 when the output of signal generator 420 is high, coil 414 is active, and pump transmitter 404 is isolated from physics cell 402. The resulting signal is called the absorption signal 710.

Figure 7C:
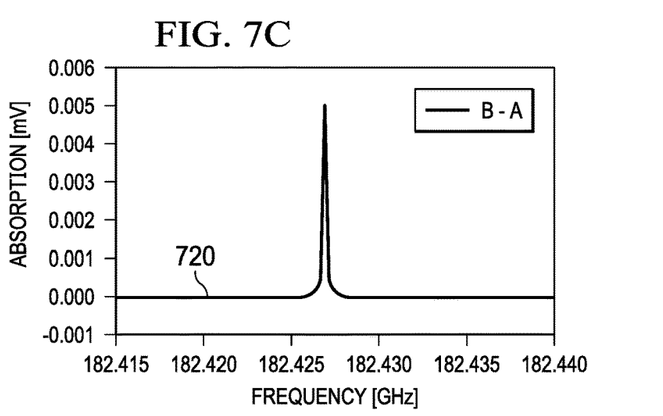
FIG. 7C illustrates the results obtained by subtracting the data of FIG. 7A from the data of FIG. 7B.

FIG. 7C illustrates the results obtained by subtracting the data of FIG. 7B from the data of FIG. 7A. In operation, electronic recording device 422 records first millimeter wave amplitude data from receiver 406 as pump transmitter 402 sweeps through the range of frequencies while coil 414 is inactive (B=0) (the doppler free signal 700, FIG. 7A), and records second millimeter wave amplitude data from receiver 406 as pump 402 sweeps through the range of frequencies while coil 414 is active (B≠0) (the absorption signal 710, FIG. 7B). Processing system 424 produces molecular spectroscopy data by subtracting the second millimeter wave amplitude data from the first millimeter wave amplitude data. This resulting molecular spectroscopy data 720 is illustrated here.

Note that while the vertical axes illustrated in FIGS. 7A-7C show absorption in mV, any arbitrary units may be used within the scope of the present invention.

Figure 8:
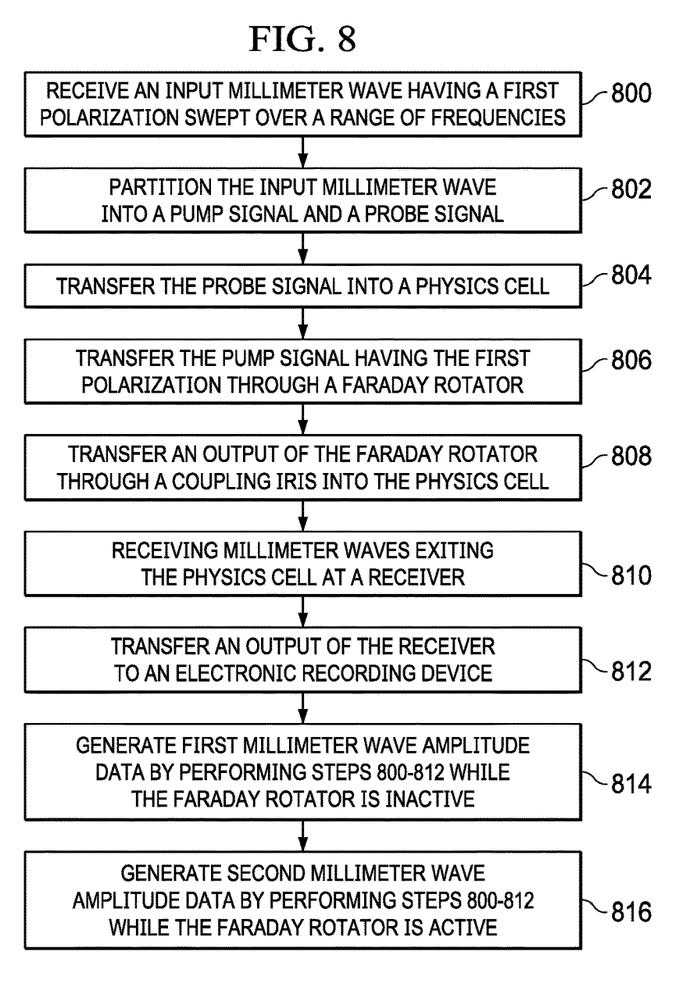
FIG. 8 is a flow chart illustrating an example method for operating a millimeter wave molecular sensor system.

FIG. 8 is a flow chart illustrating an example method for operating a millimeter wave molecular sensor system. In this example embodiment, directional coupler 410 receives a millimeter wave 430 having a first polarization swept over a range of frequencies, (operation 800).

Directional coupler 410 partitions millimeter wave 430 into a pump signal and a probe signal, each signal comprising a portion of power of millimeter wave 430, (operation 802). Probe transmitter 408 transfers the probe signal into physics cell 402 through coupling link 418, (operation 804).

The pump signal having the first polarization is transferred through pump transmitter 404, and through a Faraday rotator, (operation 806). The Faraday rotator is configured to transform the pump signal having the first polarization into a pump signal having a second polarization when activated.

An output of the Faraday rotator is transferred through coupling iris 416 into physics cell 402, (operation 808). Coupling iris 416 is configured to pass pump signals having the first polarization and to block pump signals having the second polarization.

Receiver 406 receives millimeter waves exiting physics cell 402 after passing through the sample, (operation 810).

Receiver 406 transfers an output to electronic recording device 422, configured to receive and record millimeter wave amplitude data from receiver 406 as the input millimeter waves sweep through the range of frequencies, (operation 812).

First millimeter wave amplitude data are obtained by performing operations 800-812 while the Faraday rotator is inactive, (operation 814). Second millimeter wave amplitude data is obtained by performing operations 800-812 while the Faraday rotator is active, (operation 816). Processing system 424 produces molecular spectroscopy data by subtracting the second millimeter wave amplitude data from the first millimeter wave amplitude data.

What is claimed is:

1. A millimeter wave molecular sensor system, comprising:
   a physics cell configured to contain a sample;
   a directional coupler configured to receive input millimeter waves swept over a range of frequencies, and partition the input millimeter waves into a pump signal and a probe signal, each signal comprising a portion of power of the input millimeter waves;
   a pump transmitter coupled with the directional coupler configured to transfer the pump signal to the physics cell;
   a probe transmitter coupled with the directional coupler configured to transfer the probe signal to the physics cell;
   a receiver coupled with the physics cell configured to receive millimeter waves exiting the physics cell after passing through the sample;
   a Faraday rotator coupled between the pump transmitter and the physics cell configured to pass millimeter waves from the pump transmitter to the physics cell, comprising:
     a Faraday material; and
     an electronic device configured to apply a magnetic field to the Faraday material parallel to a propagation direction of the millimeter waves passing through the Faraday material such that when the electronic device is activated, the Faraday material rotates a polarization of the millimeter waves passing through the Faraday rotator; and
   a coupling iris coupled between the Faraday rotator and the physics cell, configured to pass millimeter waves having a first polarization into the physics cell.

2. The millimeter wave molecular sensor system of claim 1, wherein the electronic device is a coil substantially surrounding the Faraday material.

3. The millimeter wave molecular sensor system of claim 2, wherein the electromagnetic pump is configured to transfer millimeter waves having the first polarization, and the Faraday rotator is configured such that when the coil is activated the Faraday material rotates a polarization of the millimeter waves passing through the Faraday rotator into a second polarization, different from the first polarization.

4. The millimeter wave molecular sensor system of claim 3, wherein the second polarization is at least five degrees from the first polarization.

5. The millimeter wave molecular sensor system of claim 3, wherein the pump signal has a higher power than the probe signal.

6. The millimeter wave molecular sensor system of claim 3, further comprising:
an electronic recording device coupled with the receiver, configured to receive and record millimeter wave amplitude data from the receiver as the input millimeter waves sweep through the range of frequencies.

7. The millimeter wave molecular sensor system of claim 6, wherein the electronic recording device is configured to:
record first millimeter wave amplitude data from the receiver as the input millimeter waves sweep through the range of frequencies while the coil is inactive; and
record second millimeter wave amplitude data from the receiver as the input millimeter waves sweep through the range of frequencies while the coil is active.

8. The millimeter wave molecular sensor system of claim 7, further comprising:
a processing system coupled with the electronic recording device, configured to produce molecular spectroscopy data by subtracting the second millimeter wave amplitude data from the first millimeter wave amplitude data.

9. The millimeter wave molecular sensor system of claim 8, further comprising:
a signal generator coupled with the coil, configured to apply a repeating electronic signal to the coil such that the coil alternates between being activated and inactivated on a repeating cycle;
wherein the input millimeter waves sweep through the range of frequencies each time the coil is activated and inactivated;
wherein the processing system is configured to produce molecular spectroscopy data during each cycle.

10. The millimeter wave molecular sensor system of claim 9, wherein the processing system is further configured to average the molecular spectroscopy data produced during a plurality of cycles.

11. The millimeter wave molecular sensor system of claim 10, wherein the processing system is further configured to identify at least one molecule within the sample based at least in part on the average molecular spectroscopy data.

12. A method for operating a millimeter wave molecular sensor system, comprising:
a. receiving an input millimeter wave having a first polarization swept over a range of frequencies;
b. partitioning the input millimeter wave into a pump signal and a probe signal, each signal comprising a portion of power of the input millimeter wave;
c. transferring the probe signal into a physics cell through a probe transmitter;
d. transferring the pump signal having the first polarization through a pump transmitter, and through a Faraday rotator, the Faraday rotator configured to transform the pump signal having the first polarization into a pump signal having a second polarization when activated;
e. transferring an output of the Faraday rotator through a coupling iris to the physics cell containing a sample, wherein the coupling iris is configured to pass pump signals having the first polarization and to block pump signals having the second polarization;
f. receiving millimeter waves exiting the physics cell at a receiver configured to receive millimeter waves exiting the physics cell after passing through the sample;
g. transferring an output of the receiver to an electronic recording device, configured to receive and record millimeter wave amplitude data from the receiver as the pump signal and probe signal sweep through the range of frequencies;
h. generating first millimeter wave amplitude data by performing steps a-g while the Faraday rotator is inactive; and
i. generating second millimeter wave amplitude data by performing steps a-g while the Faraday rotator is active.

13. The method of claim 12, wherein the Faraday rotator comprises:
a Faraday material; and
an electronic device configured to apply a magnetic field to the Faraday material parallel to a propagation direction of millimeter waves passing through the Faraday material such that when the electronic device is activated, the Faraday material rotates a polarization of the millimeter waves passing through the Faraday rotator.

14. The method of claim 13, wherein the electronic device is a coil substantially surrounding the Faraday material.

15. The method of claim 12, wherein the second polarization is at least five degrees from the first polarization.

16. The method of claim 12, further comprising:
j. producing molecular spectroscopy data by subtracting the second millimeter wave amplitude data from the first millimeter wave amplitude data.

17. The method of claim 16, further comprising:
k. repeating steps h-j in a cycle to produce molecular spectroscopy data during each cycle.

18. The method of claim 17, further comprising:
l. averaging the molecular spectroscopy data produced during a plurality of cycles.

19. The method of claim 18, further comprising:
m. determining an identity of at least one molecule within the sample based at least in part on the average molecular spectroscopy data.

20. The method of claim 19, further comprising:
n. providing a user with the identity of the at least one molecule within the sample.

* * * * *